US012352486B2

(12) United States Patent
Cambio (10) Patent No.: US 12,352,486 B2
(45) Date of Patent: Jul. 8, 2025

(54) TWO-STAGE COMPRESSOR HAVING VARIABLE SPEED FIRST STAGE (71) Applicant: TRANE INTERNATIONAL INC., Davidson, NC (US)

(72) Inventor: Matthew Cambio, La Crosse, WI (US)

(73) Assignee: TRANE INTERNATIONAL INC., Davidson, NC (US)

( * ) Notice: Subject to any disclaimer, the term of this patent is extended or adjusted under 35 U.S.C. 154(b) by 186 days.

(21) Appl. No.: 17/815,474

(22) Filed: Jul. 27, 2022

(65) Prior Publication Data
US 2024/0035711 A1 Feb. 1, 2024

(51) Int. Cl.
F25B 7/00 (2006.01)
F25B 31/02 (2006.01)

(52) U.S. Cl.
CPC ............... F25B 7/00 (2013.01); F25B 31/02 (2013.01)

(58) Field of Classification Search
CPC .... F25B 7/00; F25B 31/02; F25B 1/10; F25B 2600/022; F25B 13/00
See application file for complete search history.

(56) References Cited

U.S. PATENT DOCUMENTS

| | | | | |
|---|---|---|---|---|
| 2,938,361 A | * | 5/1960 | McNatt | F25B 13/00 62/175 |
| 4,306,420 A | * | 12/1981 | Cann | F25B 1/10 62/196.2 |
| 6,726,457 B2 | | 4/2004 | Wenzel | |
| 2002/0127122 A1 | | 9/2002 | Wenzel | |
| 2008/0173034 A1 | | 7/2008 | Shaw et al. | |
| 2015/0219379 A1 | * | 8/2015 | Sun | F25B 9/008 62/115 |
| 2022/0049880 A1 | * | 2/2022 | Chiba | F25B 1/10 |

FOREIGN PATENT DOCUMENTS

| | | | |
|---|---|---|---|
| DE | 19933202 B4 | 4/2006 | |
| EP | 2894417 A1 | * 7/2015 | ............... F25B 1/10 |
| EP | 2894417 B1 | 3/2018 | |

OTHER PUBLICATIONS

English translation of Herrs et al. (EP 2894417 A1). (Year: 2015).*
Compair by Gardner Denver, "Turboscrew Clean by Design", Apr. 2019 (8 pages).
Gardner Denver, "VST Series, VST55-260 (75-350 HP) Two-Stage Variable Speed Rotary Screw Compressors VST Series", May 2016 (12 pages).
Extended European Search Report; European Patent Application No. 23188182.2, Dec. 13, 2023 (8 pages).

* cited by examiner

Primary Examiner — Miguel A Diaz
(74) Attorney, Agent, or Firm — HSML P.C.

(57) ABSTRACT

A compressor driven by a variable-frequency drive (VFD) is provided to supplement operation of another compressor of a heating, ventilation, air conditioning, and refrigeration (HVACR) system, such as heat pump operations at low ambient temperatures. The VFD is controlled to provide efficient pressure ratios for each compressor of the HVACR system when the compressor driven by the VFD is used to supplement the other compressor. The compressor driven by the VFD can be included as a built-in compressor of the HVACR system or added subsequently as part of a booster package.

20 Claims, 3 Drawing Sheets

TWO-STAGE COMPRESSOR HAVING VARIABLE SPEED FIRST STAGE

FIELD

This disclosure is directed to heating, ventilation, air conditioning, and refrigeration (HVACR) systems including a two-stage compressor where the first stage is a variable-speed first stage, particularly to support high-lift heating operations.

BACKGROUND

Air source heat pumps can experience significant impairments to heating operations when heating is required at low ambient temperatures. Multiple stage compressors can be used to obtain greater lift, higher efficiency, and improved capacity to meet heating requirements for low ambient temperatures.

SUMMARY

This disclosure is directed to heating, ventilation, air conditioning, and refrigeration (HVACR) systems including two-stage compressor where the first stage is a variable-speed first stage, particularly to support high-lift heating operations.

By providing an additional compressor that can optionally be used to support high-lift operations such as heating when at low ambient temperatures, compressor sizing for a regular-use compressor of the HVACR system can be made appropriate to typical demand conditions such as regular cooling operations and some heating operations at moderate to relatively high ambient temperatures. By using a variable-frequency drive (VFD) to control this additional compressor, efficient operation of the multiple compressors can be achieved through matching the pressure ratios of each compressor, and allowing the additional compressor to be readily integrated into operation of the HVACR system.

In an embodiment, a heating, ventilation, air conditioning, and refrigeration (HVACR) system includes a compressor section including a first compressor and a second compressor, a first heat exchanger, an expander, and a second heat exchanger. The first compressor includes a variable-frequency drive, and the HVACR system includes a bypass line and one or more valves configured such that the first compressor can be selectively bypassed.

In an embodiment, the HVACR system further includes a flow reverser. In an embodiment, the flow reverser has a heating operation position and a cooling operation position. In an embodiment, the first compressor is bypassed when the flow reverser is in the cooling operation position. In an embodiment, the first compressor is not bypassed when the flow reverser is in the heating operation position.

In an embodiment, the second compressor includes a second variable-frequency drive.

In an embodiment, the HVACR system further includes a controller configured to determine an operating speed for the first compressor and control the variable-frequency drive to operate the first compressor at the determined operating speed. In an embodiment, the operating speed is determined based on a pressure ratio of the first compressor and a pressure ratio of the second compressor.

In an embodiment, the HVACR system further includes a second variable-frequency drive included in the second compressor. The controller is configured to determine the operating speed for the first compressor based on a capacity demand, and to determine an operating speed for the second compressor based at least in part on an interstage pressure between the first compressor and the second compressor.

In an embodiment, the first compressor has a rated capacity that is greater than a rated capacity of the second compressor.

In an embodiment, a compressor booster package includes a booster compressor driven by a variable-frequency drive, an input line, a booster compressor suction line connected to the input line, a bypass line connected to the input line, and a booster compressor discharge line. The bypass line is configured to connect to the booster compressor discharge line so as to bypass the booster compressor. The booster compressor discharge line is configured to be attached to a suction line of a compressor of an HVACR system that the compressor booster package is installed into In an embodiment, the booster compressor suction line includes a first valve and the bypass line includes a second valve.

In an embodiment, the compressor booster package further includes a controller configured to determine an operating speed for the booster compressor and to control the variable-frequency drive to operate the booster compressor at the determined operating speed.

In an embodiment, the controller is configured to determine the operating speed based on a pressure ratio of the booster compressor and a pressure ratio of a compressor of a heating, ventilation, air conditioning, and refrigeration system that the compressor booster package is connected to by way of the input line and the booster compressor discharge line.

In an embodiment, the controller is configured to determine the operating speed for the first compressor based on a capacity demand.

In an embodiment, a method of operating a heating, ventilation, air conditioning, and refrigeration (HVACR) system including a first compressor and a second compressor includes operating the second compressor, determining a heating mode or a cooling mode of the HVACR system and when in the heating mode, operating the first compressor in addition to the second compressor. Operating the first compressor includes determining, using a controller, an operational speed for the first compressor and controlling a variable-frequency drive of the first compressor, using the controller, to operate the first compressor at the determined operational speed.

In an embodiment, when in the cooling mode, only the second compressor is operated of the first and second compressors.

In an embodiment, determining the operational speed for the first compressor is based on a pressure ratio of the first compressor and a pressure ratio of the second compressor.

In an embodiment, the first compressor is a booster compressor of a compressor booster package attached to the HVACR system.

In an embodiment, the second compressor includes a second variable-frequency drive. The operational speed for the first compressor is determined based on a capacity demand. The method further includes determining an operational speed for the second compressor based at least in part on an interstage pressure between the first compressor and the second compressor.

DETAILED DESCRIPTION

This disclosure is directed to heating, ventilation, air conditioning, and refrigeration (HVACR) systems including a two-stage compressor where the first stage is a variable-speed first stage, particularly to support high-lift heating operations.

Figure 1:
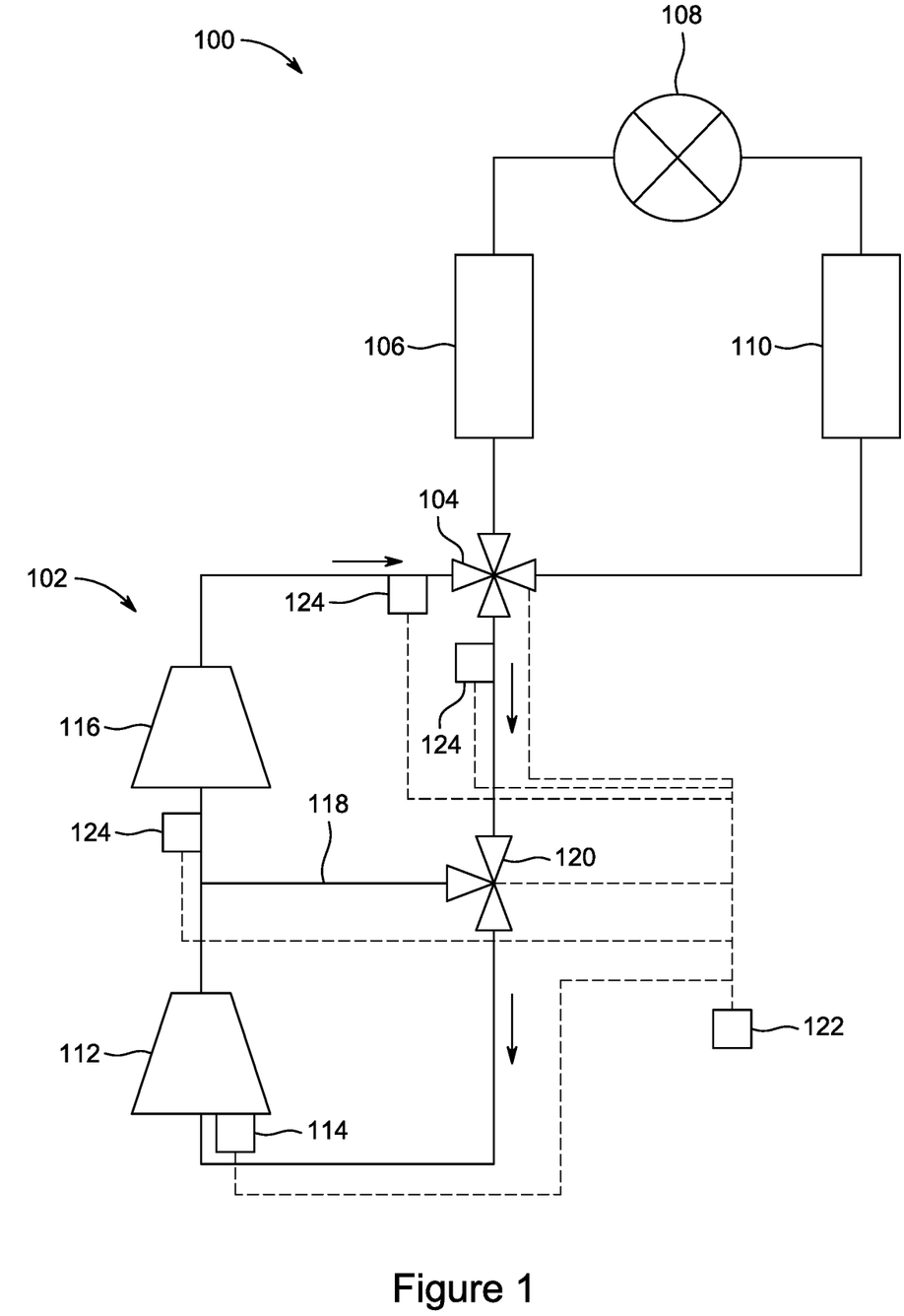
FIG. 1 shows a schematic of an HVACR system according to an embodiment.

FIG. 1 shows a schematic of an HVACR system according to an embodiment. HVACR system 100 includes compressor section 102, optional flow reverser 104, first heat exchanger 106, expander 108, and second heat exchanger 110. Compressor section 102 includes a first compressor 112, a variable-frequency drive (VFD) 114, a second compressor 116, a bypass line 118, and one or more valves 120. A controller 122 is included in HVACR system 100.

HVACR system 100 is a system configured to provide heating and/or cooling to a conditioned space. In an embodiment, the HVACR system 100 is configured to heat and/or cool air being provided to the conditioned space. In an embodiment, the HVACR system 100 is configured to heat and/or cool a process fluid that exchanges heat with air of the conditioned space. In an embodiment, HVACR system 100 is a reversible heat pump system capable of selectively providing heating and cooling to the conditioned space. HVACR system 100 circulates a working fluid to provide the heating and/or cooling to the conditioned space. The working fluid can be any suitable working fluid for use in an HVACR system 100. Non-limiting examples of suitable working fluids including R-1234ze, R-454B, blends including such working fluids, combinations thereof, and the like.

Compressor section 102 is configured to compress a working fluid of the HVACR system 100. Compressor section 102 can receive working fluid at a suction line. The working fluid can be received from, for example, first heat exchanger 106 or second heat exchanger 110, depending on the configuration of the HVACR system 100 and the position of optional flow reverser 104. In an embodiment, the suction line is connected to the flow reverser 104 such that the working fluid can be received from either the first heat exchanger 106 and the second heat exchanger 110.

Compressor section 102 includes a first compressor 112, a variable-frequency drive (VFD) 114, a second compressor 116, a bypass line 118, and one or more valves 120. First compressor 112 can be any suitable compressor, such as a screw compressor, a scroll compressor, a centrifugal compressor, or the like. The first compressor 112 can be configured to receive working fluid prior to the second compressor 116 when both first compressor 112 and second compressor 116 are in use. The first compressor 112 can include the VFD 114 to control operation of the first compressor 112. The VFD 114 can provide an output signal driving first compressor 112 at a desired operational speed. The desired operational speed can be a speed selected from within a continuous range of speeds. The first compressor 112 can be selected to have a rated capacity that is greater than a rated capacity of the second compressor 116. In an embodiment, the first compressor 112 can have a rated capacity that is between twice and three times the rated capacity of the second compressor 116. In an embodiment, the relationship between the rated capacities of first compressor 112 and second compressor 116 can be based on the expected minimum ambient temperatures for the HVACR system 100. For example, the rated capacities can be closer, such as a 2:1 ratio, for relatively high expected minimum ambient temperatures, such as where the lowest temperature expected at HVACR system 100 is approximately 0° F. In an embodiment where the expected minimum ambient temperatures are relatively low such as −20° F. to −30° F., the first compressor 112 can have a relatively greater rated capacity compared to the rated capacity of the second compressor 116, such as a 3:1 ratio of the rated capacities.

Compressor section 102 further includes second compressor 116. The second compressor 116 can be any suitable compressor, such as a screw compressor, a scroll compressor, a centrifugal compressor, or the like. In an embodiment, the second compressor 116 is the same type of compressor as first compressor 112, for example both compressors 112, 116 can be screw compressors. In an embodiment, first compressor 112 and second compressor 116 can be different types of compressors, for example with one of the compressors 112, 116 being a screw compressor and the other being a scroll compressor. In an embodiment, the second compressor 116 includes a VFD driving the second compressor 116. The second compressor 116 can be used by itself in cooling operations of the HVACR system 100, and used in conjunction with first compressor 112 in heating operations of the HVACR system 100. In an embodiment, second compressor 116 includes its own VFD, distinct from VFD 114 described above driving first compressor 112.

In compressor section 102, a bypass line 118 is included, bypassing the first compressor 112. The bypass line 118 can connect a suction line bringing working fluid to compressor section 102 to a suction of the second compressor 116. One or more valves 120 can be provided to control the flow of working fluid either through bypass line 118 or to the suction of the first compressor 112 such that the first compressor 112 can be selectively bypassed. In an embodiment, the valve 120 is a single three-way valve configured to direct flow from the suction line bringing working fluid to the compressor section 102 to either the bypass line 118 or the suction of the first compressor 112. In an embodiment, a valve 120 is included on each of the bypass line 118 and a suction line connected to the suction of the first compressor 112.

Optionally, a flow reverser 104 is included in HVACR system 100. The flow reverser 104 can be included when HVACR system 100 is a reversible heat pump capable of selectively providing heating and cooling to the conditioned space. In an embodiment where HVACR system 100 is a heat pump configured to only provide heating, flow reverser 104 may be omitted. In an embodiment, any other suitable arrangement of piping and/or valves can be provided to direct flow according to the function of HVACR system 100. Flow reverser 104 can be any suitable flow reverser, such as, for example, a four-way valve connecting to the first heat exchanger 106, second heat exchanger 110, a discharge of the compressor section 102, and a suction of the compressor section 102. In an embodiment, flow reverser 104 can direct flow from the discharge of compressor section 102 to the first heat exchanger 106 and direct flow from the second heat exchanger 110 to the suction of the compressor section 102 when the HVACR system 100 is in a cooling mode. In an embodiment, the flow reverser 104 can direct the flow from the discharge of compressor section 102 to the second heat exchanger 110 and direct flow from the first heat exchanger 106 to a suction of the compressor section 102 when the HVACR system 100 is in a heating mode.

First heat exchanger 106 can be a heat exchanger configured to exchange heat between working fluid of the HVACR system 100 and a source medium. The source medium can be any suitable source medium for HVACR system 100, such as ambient air, water, or the like. In an embodiment, the first heat exchanger 106 receives working fluid from the compressor section 102 of the HVACR system 100 when the HVACR system 100 is in the cooling mode. In the cooling mode, the first heat exchanger 106 can serve as a condenser for the working fluid being circulated in HVACR system 100, rejecting heat from the working fluid to the source medium. In the heating mode, the first heat exchanger 106 receives working fluid from the expander 108 of the HVACR system 100. In the heating mode, the first heat exchanger 106 can serve as an evaporator for the working fluid being circulated in HVACR system 100, the working fluid absorbing heat from the source medium.

Expander 108 is configured to expand the working fluid being circulated through the HVACR system 100. The expander 108 may be any suitable type of expander used in the field for expanding a working fluid to cause the working fluid to decrease in pressure and temperature. Non-limiting examples of expander 108 include one or more expansion valves, one or more expansion vessels, one or more expansion orifices such as orifices provided on orifice plates, combinations thereof, and the like. Expander 108 can receive working fluid from one of first heat exchanger 106 or second heat exchanger 110 based on the direction of flow in HVACR system and expand the received working fluid.

Second heat exchanger 110 is a heat exchanger configured to exchange heat between the working fluid circulating in HVACR system 100 and air of a conditioned space or a process fluid that ultimately exchanges heat with air of the conditioned space. In an embodiment, the second heat exchanger 110 receives working fluid from the expander 108 of the HVACR system 100 when the HVACR system 100 is in the cooling mode. In the cooling mode, the first heat exchanger 106 can serve as an evaporator for the working fluid being circulated in HVACR system 100, absorbing heat from the air of the conditioned space or a process fluid. In the heating mode, the second heat exchanger 110 receives working fluid from the compressor section 102 of the HVACR system 100. In the heating mode, the second heat exchanger 110 serves as a condenser for the working fluid being circulated in HVACR system 100, rejecting heat to the air of the conditioned space or the process fluid.

Controller 122 is configured to control at least some operations of the HVACR system 100. Controller 122 can control at least the compressor section 102 including first compressor 112, second compressor 116, and valves 120. Controller 122 can be connected to the VFD 114 to control first compressor 112. Controller 122 can be configured to control operation of the first compressor 112 based on an operating state of the HVACR system 100. For example, the controller 122 can operate the first compressor 112 during heating operation of the HVACR system 100, and not operate the first compressor 112 during cooling operation of the HVACR system 100. The controller 122 can further control operation of first compressor 112 during at least some heating operations, for example to balance the pressure ratios of the first compressor 112 and the second compressor 116 when both are in operation. In an embodiment, controller 122 can direct operation of only the second compressor 116 in heating operations where the capacity of second compressor 116 is sufficient, for example at relatively moderate to warm ambient temperatures or other situations where heating load is light enough that it can be met without requiring first compressor 112. Control of the operation of the first compressor 112 can include, for example, adjusting a speed to achieve a target speed, a target operating capacity, or a target pressure ratio, where the target is based on a pressure ratio at which the second compressor 116 is being operated. Control of the valves 120 can include bypassing the first compressor 112 by way of the bypass line 118 when the HVACR system 100 is in cooling operations, and directing working fluid to the first compressor 112 when first compressor 112 is operated during heating operations. In embodiments, controller 122 can be connected to sensors 124 and/or additional controls included in HVACR system in addition to the control of the compressor section 102 and optionally the flow reverser 104.

Sensors 124 can be included in HVACR system 100 to provide data to the controller 122. The sensors 124 can include pressure and/or temperature sensors configured to measure pressures and/or temperatures of the working fluid at various points in HVACR system 100. In the embodiment shown in FIG. 1 sensors 124 are provided at suitable positions to measure a suction pressure of the compressor section 102, a discharge pressure of the compressor section 102, and an interstage pressure of the compressor section 102, at a position between first compressor 112 and second compressor 116. It is understood that sensors 124 can be provided at different positions in the HVACR system from the example positions shown in FIG. 1, and that additional sensors 124 can be included and/or some of the sensors 124 as shown in FIG. 1 can be omitted depending on the data used by controller 122.

Figure 2:
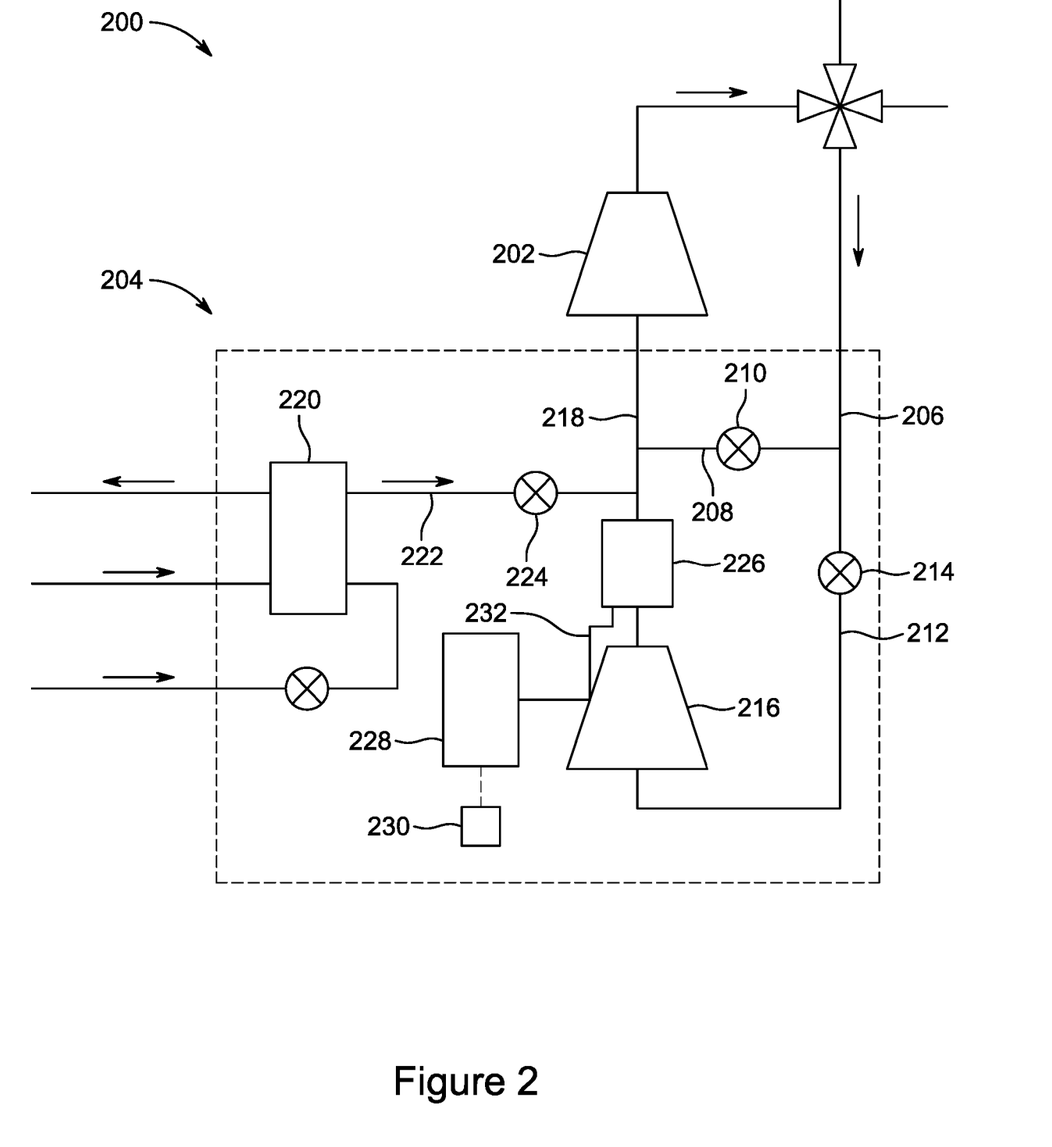
FIG. 2 shows a schematic of a compressor section of an HVACR system according to an embodiment.

FIG. 2 shows a schematic of a compressor section of an HVACR system according to an embodiment. Compressor section 200 includes second compressor 202 and booster package 204. Booster package 204 includes suction line 206, bypass line 208, bypass valve 210, first compressor intake line 212, optional first compressor intake valve 214, first compressor 216, and interstage line 218. The booster package 204 can optionally include economizer 220, economizer injection line 222, and economizer injection valve 224. The booster package 204 can optionally include a lubricant separator 226. In an embodiment, the economizer injection line 222 can instead be connected directed to a liquid line of the HVACR system, such as a fluid line downstream of a heat exchanger such as heat exchangers 106 and/or 110 as described above and shown in FIG. 1 when that heat exchanger 106, 110 is serving as the condenser of the HVACR system.

Compressor section 200 is a portion of an HVACR system configured to compress the working fluid. Compressor section 200 includes first compressor 216 provided in a booster package 204 along with a second compressor 202. Second compressor 202 can be a compressor of the HVACR system. Second compressor 202 can be any suitable compressor for use in the HVACR system. In an embodiment, second compressor 202 is a screw compressor, a centrifugal compressor, or a scroll compressor. Second compressor 202 can be included in the HVACR system in all operating modes of the HVACR system. In an embodiment, second compressor 202 is a compressor selected to satisfy the compression requirements of the HVACR system in a cooling operation, but may not be sufficient to meet the compression requirements of the HVACR system in at least some heating operations of the HVACR system, for example where the ambient temperature is extremely low during the heating operation. Discharge from the second compressor 202 can be circulated through the remainder of the HVACR system, such as the circuit of HVACR system 100 described above and shown in FIG. 1. In an embodiment, second compressor 202 includes a variable-frequency drive.

Booster package 204 can be a package added to the HVACR system including second compressor 202, so as to provide additional capacity, for example to support heating operations where the HVACR system is a heat pump. The booster package 204 can be an optional package for inclusion when installing the HVACR system, a retrofit package for addition to the HVACR system following its installation, or any other suitable arrangement for inclusion.

Suction line 206 is a line supplying working fluid from the HVACR system to the booster package 204 attached to said HVACR system. The suction line 206 can convey working fluid from a heat exchanger functioning as an evaporator of the HVACR system, such as first and/or second heat exchangers 106, 110 described above and shown in FIG. 1. In an embodiment, suction line 206 conveys working fluid from a flow reverser of the HVACR system, such as flow reverser 104 described above and shown in FIG. 1, to the booster package 204 when the HVACR system is a reversible heat pump.

Bypass line 208 is a fluid line configured to convey working fluid received at suction line 206 to the suction of second compressor 202. In an embodiment, the working fluid can be conveyed to the suction of second compressor 202 by interstage line 218 as well as bypass line 208, for example by having the bypass line 208 join the interstage line. In an embodiment, the bypass line 218 can join the interstage line 218 downstream of any other optional inclusions in the booster package 204, for example joining downstream of economizer injection line 222 and/or lubricant separator 226. Flow into or through bypass line 208 can be controlled by a bypass valve 210. Bypass valve 210 is a valve that can be controlled to prevent or allow flow through bypass line 208. The bypass valve 210 can be controlled such that the bypass valve 210 is in an open position when the first compressor 216 is to be bypassed, such as when the HVACR system that booster package 204 is installed into is in a cooling mode, or when second compressor 202 is sufficient to meet operational demand. The bypass valve 210 can be in a closed position when first compressor 216 is utilized, for example when in a heating mode, or when second compressor 202 is insufficient to meet the operational demands on the HVACR system that booster package 204 is installed into.

First compressor intake line 212 is a fluid line configured to convey working fluid from the suction line 206 to the suction of first compressor 216. Flow into or through the first compressor intake line 212 can optionally be controlled by first compressor intake valve 214. Optional first compressor intake valve 214 can be a valve that can be controlled to prevent or allow flow through the first compressor intake line 212. The optional first compressor intake valve 214 can be controlled such that the first compressor intake valve 214 is open when the first compressor 216 is being utilized, and closed when the first compressor 216 is bypassed by way of bypass line 208 and when bypass valve 210 is open.

In an embodiment, first compressor intake valve 214 and bypass valve 210 can be replaced by a three-way valve such as the valve 120 shown in FIG. 1 and described above, configured to direct flow from suction line 206 to one of bypass line 208 when the first compressor 216 is to be bypassed, and to direct flow from suction line 206 to the first compressor intake line 212 when first compressor 216 is utilized.

First compressor 216 is a compressor included in booster package 204. First compressor 216 can be any suitable compressor for use to supplement second compressor 202 in the HVACR system into which booster package 204 is installed. In an embodiment, the first compressor 216 is a compressor of the same type as second compressor 202. In an embodiment, the first compressor 216 is a compressor of a different type from the second compressor 202. In an embodiment, the first compressor 216 is selected such that a rated capacity of the first compressor 216 is between two and three times the rated capacity of the second compressor 202. First compressor 216 can be selectively included or removed from the fluid circuit of the HVACR system including booster package 204. The first compressor 216 can be operated to supplement the second compressor 202 in some operating modes of the HVACR system, such as a heating mode, particularly when ambient temperatures are low such as being 0° F. (−17.8° C.) or less. Drive 228 can be used to control the operation of first compressor 216. In an embodiment, drive 228 is a variable frequency drive (VFD). Drive 228 can generate a signal configured to drive the operation of first compressor 216 at a determined speed. The desired operational speed can be a speed selected from within a continuous range of speeds. In an embodiment, the desired operational speed is determined by a controller 230. Controller 230 can determine the desired operational speed for first compressor 216 based on pressure ratios, so as to balance the pressure ratio of the first compressor 216 with the pressure ratio of the second compressor 202 when both first and second compressors 216, 202 are used together. The controller 230 can optionally be included in booster package 204. In an embodiment, the controller 230 can be a controller of the HVACR system that booster package 204 is used with. In an embodiment, controller 230 can determine the desired operational speed for the first compressor 216 based on data such as temperature and/or pressure data provided by one or more sensors included in the HVACR system such as the sensors 124 as discussed above and shown in FIG. 1.

Interstage line 218 is a fluid line connecting the discharge of first compressor 216 to a suction of the second compressor 202. The interstage line 218 can be configured to also receive fluid from bypass line 208 when bypass valve 210 is open, such that working fluid can bypass the first compressor 216 and pass from suction line 206 to reach the suction of the second compressor 202 without being compressed by the first compressor 216.

Optional economizer 220 can include economizer injection line 222, and economizer injection valve 224. Economizer 220 can be an economizer connected to any suitable position in the HVACR system that booster package 204 is installed into. The economizer 220 can be connected to the HVACR system through any suitable piping, such as liquid flow lines, injection lines, suitable valves such as expansion valves, and the like. Economizer 220 can be connected to the interstage line 218 by way of the economizer injection line 222. Flow through economizer injection line 222 can be controlled by economizer injection valve 224. In an embodiment, the economizer injection valve can be opened during heating operations of the HVACR system into which booster package 204 is installed. In an embodiment, the economizer 220, economizer injection line 222, and economizer injection valve 224 can be omitted from the booster package 204. In an embodiment, an existing economizer of the HVACR system that booster package 204 is installed into is used with booster package 204, for example by connecting the existing economizer to the economizer injection line 222 and economizer injection valve 224. In an embodiment, the economizer injection line 222 can instead be connected directly to a liquid line of the HVACR system, such as a fluid line downstream of a heat exchanger such as heat exchangers 106 or 110 as described above and shown in FIG. 1 when that heat exchanger 106, 110 is serving as the condenser of the HVACR system. Working fluid from this liquid line can be injected into interstage line 218 by way of economizer injection line 222 and economizer injection valve 224, without use of a separate economizer 220.

Optional lubricant separator 226 can be included in the booster package 206. The lubricant separator can be any suitable separator for removing lubricant from working fluid discharged from the first compressor 216. The lubricant separator 226 can be disposed at any point along interstage line 218. In an embodiment, the lubricant separator 226 can be configured to provide recovered lubricant to the first compressor 216, for example by way of a lubricant return line 232.

Figure 3:
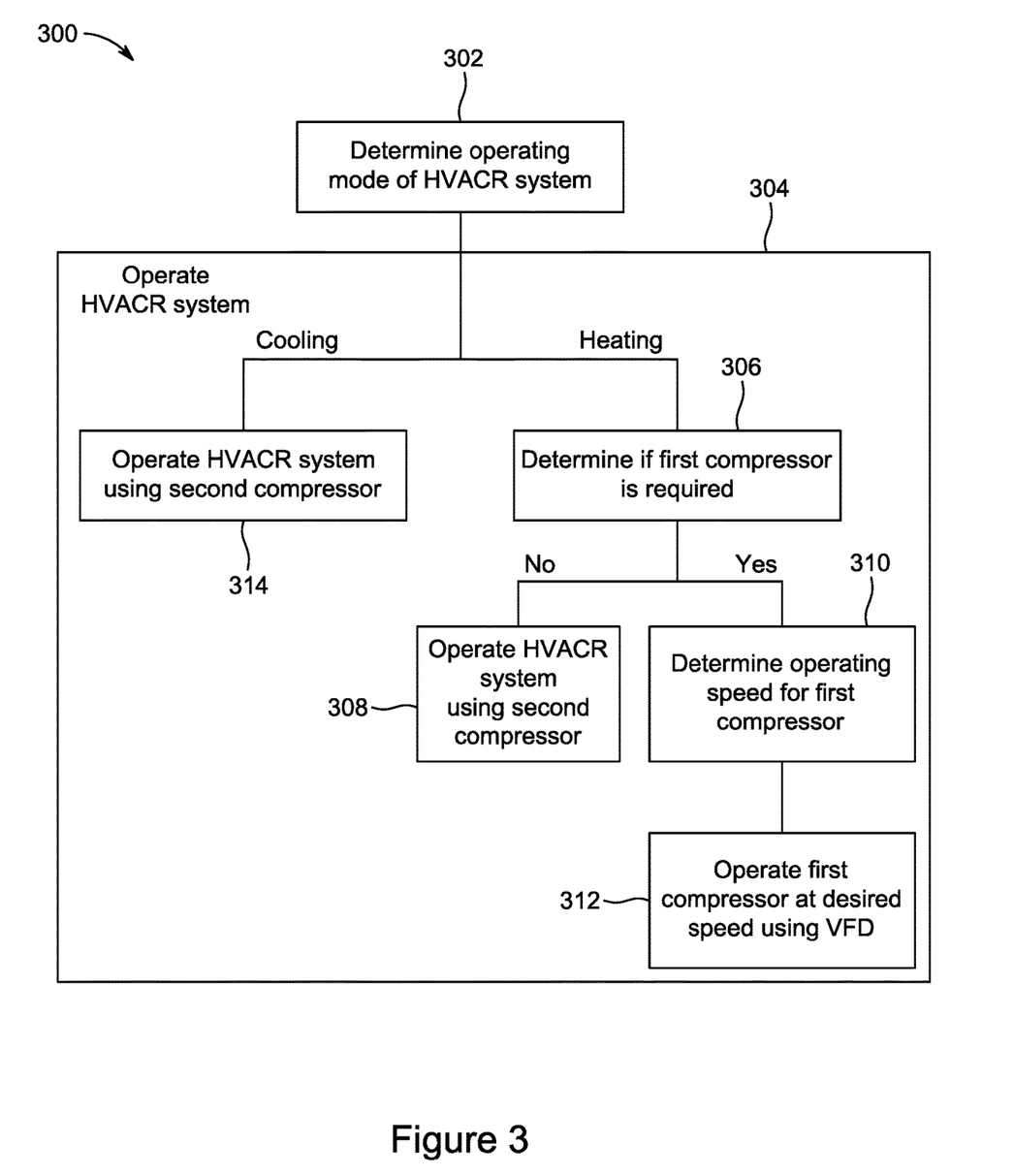
FIG. 3 shows a flowchart of a method for operating an HVACR system according to an embodiment.

FIG. 3 shows a flowchart of a method for operating an HVACR system according to an embodiment. Method 300 includes determining an operating mode of the HVACR system 302, and operating the HVACR system according to the operating mode 304. Operating the HVACR system according to the operating mode at 304 can include determining if a first compressor is required 306. If the first compressor is not required, the HVACR system can be operated in a heating mode using the second compressor 308. If the first compressor is required, an operating speed of a first compressor is determined 310 and the first compressor is operated at the determined speed using a variable-frequency drive (VFD) 312. In an embodiment, operating the HVACR system at 304 can include operating the HVACR system in the cooling mode using a second compressor at 314 when it is determined at 302 that the HVACR system is in a cooling mode.

The method 300 can be performed using an HVACR system including at least two compressors. In an embodiment, the method 300 is performed on an HVACR system including a first stage compressor and a second stage compressor where the first stage compressor is driven by a VFD, such as HVACR system 100 described above and shown in FIG. 1. In an embodiment, the method 300 is performed on an HVACR system that has had a booster package installed such as an HVACR system including a compressor section 200 as described above and shown in FIG. 2. Method 300 can be performed using one or more controllers such as controller 122 described above and shown in FIG. 1 to perform determinations and generate commands. Method 300 can further be based on data such as temperature and/or pressure data provided by one or more sensors included in the HVACR system such as the sensors 124 as discussed above and shown in FIG. 1.

An operating mode is determined at 302. The operating mode determined at 302 can be a heating mode or a cooling mode of the HVACR system. The operating mode can be determined based on a command from a building automation system or a thermostat system, receipt of one or more calls for heating or cooling from the space conditioned by the HVACR system, a position of a flow reverser of the HVACR system, or any other suitable determination of the operating mode of the HVACR system. In an embodiment, the operating mode can further include particular operational parameters of components of the HVACR system such as an operating speed and/or pressure ratio of the second compressor of the HVACR system.

The HVACR system is operated according to the operating mode at 304. In an embodiment, the heating operation mode can include determining if the first compressor is required 306 and operation of the first compressor 312 where the first compressor is required and the cooling mode includes only operation of the second compressor. In an embodiment, the operating mode can be characterized by the required lift to be provided by the compressor section of the HVACR system, and the operation or exclusion of the first compressor determined at 306 can be based on the ability of the second compressor to provide sufficient lift. When the operating mode includes operation of the first compressor, operating the HVACR system according to the operating mode can include determining an operating speed for the first compressor 310 and operating the first compressor at the desired speed at 312. When the operating mode does not include operation of the first compressor, the operation of the HVACR system can be operation using the second compressor at 308. In embodiments, whether the first compressor is required can be determined at 306 based on a discharge temperature of the second compressor, a leaving temperature for process fluid from the heat exchanger serving as the condenser, or the like.

When the first compressor is utilized, an operating speed is determined for the first compressor at 310. The operating speed can be determined directly or can be a value derived from or associated with other operational parameters of the first compressor such as pressure ratio, operating capacity, or any other such suitable operational parameter of the first compressor. The operating speed is determined so as to balance the pressure ratios of the operation of the first compressor and the second compressor, while meeting the overall demand on the compressor section of the HVACR system. The operating speed for the first compressor determined at 306 can be based on a pressure ratio of the second compressor, which can in turn be determined directly or determined based on data such as temperature and pressure data from the HVACR system, for example data obtained by sensors included in the HVACR system. Examples of such data can include, as a non-limiting example, suction, interstage, and discharge pressures for the compressor section including the first and second compressors. The operating speed of the first compressor can be determined at 310 to control the flow exiting from the first compressor based on the flow requirements of the second compressor, according to the pressure ratio of the second compressor. By controlling flow out of the first compressor based on flow requirements of the second compressor, the compression by the combination of the first and second compressors can be made more efficient, and excess or insufficient interstage flow conditions can be avoided.

The first compressor is operated at the determined operating speed at 312. The first compressor can be operated at 312 by providing a command to the VFD such that the VFD outputs a signal driving the first compressor at the determined operating speed. Operating the first compressor at 312 further includes directing working fluid to the first compressor, instead of bypassing the first compressor. Directing working fluid to the first compressor can include controlling one or more valves in the compressor section of the HVACR system such that a bypass line bypassing the first compressor is obstructed, while valves allow flow of working fluid to pass to the suction of the first compressor. Operation of the first compressor at the determined operating speed compresses working fluid, which is discharged from the first compressor and then passes to the suction of the second compressor to be further compressed by operation of the second compressor.

In an embodiment, when the HVACR system is in a cooling mode, the HVACR system can be operated using the second compressor at 314. Operating the HVACR system in the cooling mode at 314 can be performed using only the second compressor of the HVACR system. Operating the HVACR system in the cooling mode at 314 can be performed without use of the first compressor. In an embodiment, operating the HVACR system without use of the first compressor can include bypassing the first compressor, for example using one or more valves to direct flow into a bypass line and preventing flow of working fluid to a suction of the first compressor. At 314, the second compressor can be operated at operating parameters sufficient to meet the cooling demand on the HVACR system without additional use of the first compressor.

In an embodiment, when the HVACR system is in a heating mode, but the first compressor is not required to support the heating operation as determined at 306, the HVACR system can be operated in the heating mode using the second compressor at 308. Operation using the second compressor at 308 can be performed without use of the first compressor. In an embodiment, operating the HVACR system without use of the first compressor can include bypassing the first compressor, for example using one or more valves to direct flow into a bypass line and preventing flow of working fluid to a suction of the first compressor. At 308, the second compressor can be operated at operating parameters sufficient to meet the heating demand on the HVACR system without additional use of the first compressor.

In an embodiment, startup of an HVACR system according to an embodiment includes first starting up a second compressor such as second compressors 116 or 202 as described above and shown in FIGS. 1 and 2, respectively, then subsequently starting up the first compressor such as first compressors 112 or 216 as described above and shown in FIGS. 1 and 2 respectively. In an embodiment, a period of time between the starting of the second compressor and the starting of the first compressor can be 30 seconds or less.

Aspects:

It is understood that any of aspects 1-10 can be combined with any of aspects 11-15 or 16-20. It is understood that any of aspects 11-15 can be combined with any of aspects 16-20.

Aspect 1. A heating, ventilation, air conditioning, and refrigeration (HVACR) system, comprising:
- a compressor section including a first compressor and a second compressor;
- a first heat exchanger;
- an expander; and
- a second heat exchanger;
- wherein the first compressor includes a variable-frequency drive, and the HVACR system includes a bypass line and one or more valves configured such that the first compressor can be selectively bypassed.

Aspect 2. The HVACR system according to aspect 1, further comprising a flow reverser.

Aspect 3. The HVACR system according to aspect 2, wherein the flow reverser has a heating operation position and a cooling operation position.

Aspect 4. The HVACR system according to aspect 3, wherein the first compressor is bypassed when the flow reverser is in the cooling operation position.

Aspect 5. The HVACR system according to any of aspects 2-4, wherein the first compressor is not bypassed when the flow reverser is in a heating operation position.

Aspect 6. The HVACR system according to any of aspects 1-5, wherein the second compressor includes a second variable-frequency drive.

Aspect 7. The HVACR system according to any of aspects 1-6, further comprising a controller configured to determine an operating speed for the first compressor and control the variable-frequency drive to operate the first compressor at the determined operating speed.

Aspect 8. The HVACR system according to aspect 7, wherein the operating speed is determined based on a pressure ratio of the first compressor and a pressure ratio of the second compressor.

Aspect 9. The HVACR system according to any of aspects 7-8, further comprising a second variable-frequency drive included in the second compressor, wherein the controller is configured to determine the operating speed for the first compressor based on a capacity demand, and to determine an operating speed for the second compressor based at least in part on an interstage pressure between the first compressor and the second compressor.

Aspect 10. The HVACR system according to any of aspects 1-9, wherein the first compressor has a rated capacity that is greater than a rated capacity of the second compressor.

Aspect 11. A compressor booster package comprising:
- a booster compressor, the booster compressor driven by a variable-frequency drive;
- an input line;
- a booster compressor suction line connected to the input line;
- a bypass line connected to the input line; and
- a booster compressor discharge line,
- wherein the bypass line is configured to connect to the booster compressor discharge line so as to bypass the booster compressor, and
- wherein the booster compressor discharge line is configured to be attached to a suction line of a compressor of an HVACR system that the compressor booster package is installed into.

Aspect 12. The compressor booster package according to aspect 11, wherein the booster compressor suction line includes a first valve and the bypass line includes a second valve.

Aspect 13. The compressor booster package according to aspect 11 or 12, further comprising a controller configured to determine an operating speed for the booster compressor and to control the variable-frequency drive to operate the booster compressor at the determined operating speed.

Aspect 14. The compressor booster package according to aspect 13, wherein the controller is configured to determine the operating speed based on a pressure ratio of the booster compressor and a pressure ratio of a compressor of a heating, ventilation, air conditioning, and refrigeration system that the compressor booster package is connected to by way of the input line and the booster compressor discharge line.

Aspect 15. The compressor booster package according to any of aspects 13-14, wherein the controller is configured to determine the operating speed for the first compressor based on a capacity demand.

Aspect 16. A method of operating a heating, ventilation, air conditioning, and refrigeration (HVACR) system, including a first compressor and a second compressor comprising:
- operating the HVACR system using the second compressor;
- determining a heating mode or a cooling mode of the HVACR system; and
- when in the heating mode, operating the first compressor in addition to the second compressor, wherein operating the first compressor includes:
- determining, using a controller, an operational speed for the first compressor; and
- controlling a variable-frequency drive of the first compressor, using the controller, to operate the first compressor at the determined operational speed.

Aspect 17. The method according to aspect 16, wherein when in the cooling mode, only the second compressor is operated of the first and second compressors.

Aspect 18. The method according to aspect 16 or 17, wherein determining the operational speed for the first compressor is based on a pressure ratio of the first compressor and a pressure ratio of the second compressor.

Aspect 19. The method according to any of aspects 16-18, wherein the first compressor is a booster compressor of a compressor booster package attached to the HVACR system.

Aspect 20. The method of claim 16, wherein the second compressor includes a second variable-frequency drive, wherein the operational speed for the first compressor is determined based on a capacity demand, the method further comprising determining an operational speed for the second compressor based at least in part on an interstage pressure between the first compressor and the second compressor.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A heating, ventilation, air conditioning, and refrigeration (HVACR) system, comprising:
   a compressor section including a first compressor and a second compressor, the first compressor includes a variable-frequency drive;
   a first heat exchanger;
   an expander;
   a second heat exchanger;
   a bypass line and one or more valves configured such that the first compressor can be selectively bypassed; and
   a controller configured to control operation of the compressor section, the controller configured to not operate the first compressor in a cooling mode of the HVACR system and to operate both the first compressor and the second compressor in a heating mode of the HVACR system.

2. The HVACR system of claim 1, wherein the second compressor includes a second variable-frequency drive.

3. The HVACR system of claim 1, wherein the first compressor has a rated capacity that is greater than a rated capacity of the second compressor.

4. The HVACR system of claim 1, wherein in the heating mode, the controller is configured to determine whether operation of the first compressor is required based on an ability of the second compressor to provide sufficient lift and is configured to operate the first compressor in response to the second compressor being unable to provide the sufficient lift.

5. The HVACR system of claim 1, wherein the controller is configured to determine an operating speed for the first compressor and control the variable-frequency drive to operate the first compressor at the determined operating speed.

6. The HVACR system of claim 5, wherein the operating speed is determined based on a pressure ratio of the first compressor and a pressure ratio of the second compressor.

7. The HVACR system of claim 5, further comprising a second variable-frequency drive included in the second compressor, wherein the controller is configured to determine the operating speed for the first compressor based on a capacity demand, and to determine an operating speed for the second compressor based at least in part on an interstage pressure between the first compressor and the second compressor.

8. The HVACR system of claim 1, further comprising a flow reverser.

9. The HVACR system of claim 8, wherein the flow reverser has a heating operation position for the heating mode and a cooling operation position for the cooling mode.

10. The HVACR system of claim 9, wherein
    the first compressor is bypassed when the flow reverser is in the cooling operation position, and
    the first compressor is not bypassed when the flow reverser is in the heating operation position.

11. A compressor booster package comprising:
    a booster compressor, the booster compressor driven by a variable-frequency drive;
    an input line;
    a booster compressor suction line connected to the input line;
    a bypass line connected to the input line; and
    a booster compressor discharge line configured to be attached to a suction line of a compressor of a heating, ventilation, air conditioning, and refrigeration (HVACR) system that the compressor booster package is installed into, the bypass line being configured to connect to the booster compressor discharge line so as to bypass the booster compressor; and
    a controller to control operation of the booster compressor package, the controller configured to not operate the booster compressor in a cooling mode of the HVACR system and to operate the booster compressor in combination with the compressor of the HVACR in a heating mode of the HVACR system.

12. The compressor booster package of claim 11, wherein the booster compressor suction line includes a first valve and the bypass line includes a second valve.

13. The compressor booster package of claim 11, wherein in the heating mode, the controller is configured to determine whether operation of the booster compressor is required based on an ability of the compressor in the HVACR system to provide sufficient lift, and the controller operates the booster compressor in response to the compressor of the HVACR system being unable to provide the sufficient lift.

14. The compressor booster package of claim 11, wherein the controller is configured to determine an operating speed for the booster compressor and to control the variable-frequency drive to operate the booster compressor at the determined operating speed.

15. The compressor booster package of claim 14, wherein the controller is configured to determine the operating speed based on a pressure ratio of the booster compressor and a pressure ratio of the compressor of the HVACR system that the compressor booster package is connected to by way of the input line and the booster compressor discharge line.

16. The compressor booster package of claim 14, wherein the controller is configured to determine the operating speed for the booster compressor based on a capacity demand.

17. A method of operating a heating, ventilation, air conditioning, and refrigeration (HVACR) system, including a first compressor and a second compressor comprising:
    operating the HVACR system in a cooling mode, wherein when in the cooling mode, operating the second compressor and not operating the first compressor;

operating the HVACR system in a heating mode, which includes operating both the first compressor and the second compressor, wherein the operating of the first compressor includes:

determining, using a controller, an operational speed for the first compressor; and     controlling a variable-frequency drive of the first compressor, using the controller, to operate the first compressor at the determined operational speed.

18. The method of claim 17, wherein determining the operational speed for the first compressor is based on a pressure ratio of the first compressor and a pressure ratio of the second compressor.

19. The method of claim 17, wherein the first compressor is a booster compressor of a compressor booster package attached to the HVACR system.

20. The method of claim 17, wherein the second compressor includes a second variable-frequency drive, wherein the operational speed for the first compressor is determined based on a capacity demand, the method further comprising determining an operational speed for the second compressor based at least in part on an interstage pressure between the first compressor and the second compressor.

* * * * *